United States Patent
Ma

(10) Patent No.: US 7,483,601 B2
(45) Date of Patent: Jan. 27, 2009

(54) POLARIZATION MAINTAINING OPTICAL DEVICE

(75) Inventor: Jian Ma, Thousand Oaks, CA (US)

(73) Assignee: The Boeing Company, Irvine, CA (US)

(*) Notice: Subject to any disclaimer, the term of this patent is extended or adjusted under 35 U.S.C. 154(b) by 0 days.

(21) Appl. No.: 11/557,741

(22) Filed: Nov. 8, 2006

(65) Prior Publication Data

US 2008/0106778 A1 May 8, 2008

(51) Int. Cl.
*G02B 6/26* (2006.01)
*G02B 6/42* (2006.01)

(52) U.S. Cl. .............................. 385/16; 385/17; 385/18; 385/27; 385/33

(58) Field of Classification Search ...................... None
See application file for complete search history.

(56) References Cited

U.S. PATENT DOCUMENTS

| | | | |
|---|---|---|---|
| 5,657,153 A * | 8/1997 | Endriz et al. ............. | 359/341.1 |
| 6,690,885 B1 * | 2/2004 | Aksyuk et al. ................ | 398/45 |
| 2005/0129380 A1 * | 6/2005 | Takeuchi et al. ............ | 385/137 |
| 2005/0220394 A1 * | 10/2005 | Yamamoto et al. ............ | 385/18 |

* cited by examiner

*Primary Examiner*—Sung H Pak
*Assistant Examiner*—Chad H Smith
(74) *Attorney, Agent, or Firm*—Charles L. Moore; Moore & Van Allen, PLLC

(57) ABSTRACT

A polarization maintaining optical device may include a polarization maintaining optical array. The device may also include a microlens array to receive light from the polarization maintaining optical array. In another embodiment of the present invention, the device may also include two microlens arrays, two polarization maintaining optical arrays, and an arrayed beam steering device. The microlens arrays, polarization maintaining optical arrays, and the beam steering device may be optically coupled.

24 Claims, 3 Drawing Sheets

POLARIZATION MAINTAINING OPTICAL DEVICE

BACKGROUND OF THE INVENTION

The present invention relates to optics and controlling the transmission of light energy and more particularly to a polarization maintaining optical device or switch.

Optical systems that use polarization dependent devices, such as liquid crystals, waveguides, optical instrumentation, and optical test equipment or other polarization dependent elements or devices require that the proper polarization of light energy or a light beam be maintained through the system. Optical switches are sometimes used in such systems to cross-connect optical devices or to control emission of the light energy for signaling purposes or other purposes. For example, electro-optic modulators that are polarization dependent are commonly used in fiber optical networks. Some applications require routing the output from a first set of modulators to the input of a second set of modulators using a fiber optical cross-connect switch for signal interleaving and optical encryption or for other purposes. Using a polarization maintaining fiber optical cross-connect switch will minimize polarization dependent loss and maintain signal integrity.

Another example of a need to maintain polarization is automated testing of multi-channel polarization dependent fiber optical devices. A polarization maintaining fiber optical switch is needed to switch polarized light into different channels of the polarization device under test. Optical switches are currently being used in telecom applications but these known switches do not maintain the polarization orientation of the input light beams.

BRIEF SUMMARY OF THE INVENTION

In accordance with an embodiment of the present invention, a polarization maintaining optical device may include a polarization maintaining optical array. The device may also include a microlens array to receive light from the polarization maintaining optical array.

In accordance with another embodiment of the present invention, a polarization maintaining optical switch may include a first polarization maintaining optical collimator array and a second polarization maintaining optical collimator array. The polarization maintaining optical switch may also include a beam steering device to direct light between the first and second polarization maintaining optical collimator arrays.

In accordance with another embodiment of the present invention, a polarization maintaining optical switch may include an input polarization maintaining optical fiber array to receive a light beam with a predetermined polarization and an input microlens array optically coupled to receiving the light beam from the input optical fiber array. The input microlens array collimates or modifies the wavefront of the light beam from the input optical fiber array. The optical switch may also include a beam steering device optically coupled to receive the light beam from the input microlens. The optical switch may also include an output microlens array optically coupled to receive the light beam from the beam steering device and an output polarization maintaining optical fiber array optically coupled to the output microlens to receive the light beam with the predetermined polarization. The light beam emitted from the output polarization maintaining optical fiber array may have a polarization axis aligned with the axis of the polarization maintaining optical fiber.

In accordance with another embodiment of the present invention, a system for optically switching light may include a light source. The system may also include a polarization maintaining optical switch optically coupled to the light source. The polarization maintaining optical switch may include a first polarization maintaining optical collimator array and a second polarization maintaining optical collimator array. The optical switch may also include a beam steering device optically coupled to the first and second polarization maintaining optical collimator arrays. The system may further include a polarization dependent optical device optically coupled to the polarization maintaining optical switch.

In accordance with another embodiment of the present invention, a method for maintaining polarization of a light beam through an optical device may include directing the light beam into an input polarization maintaining optical collimator array. The method may also include steering the light beam through the optical device to an output polarization maintaining optical collimator array.

In accordance with another embodiment of the present invention, a method of making a polarization maintaining optical switch may include forming a first polarization maintaining optical collimator array and forming a second polarization maintaining optical collimator array. The method may also include providing a beam steering device to direct light between the first and second polarization maintaining optical collimator arrays.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
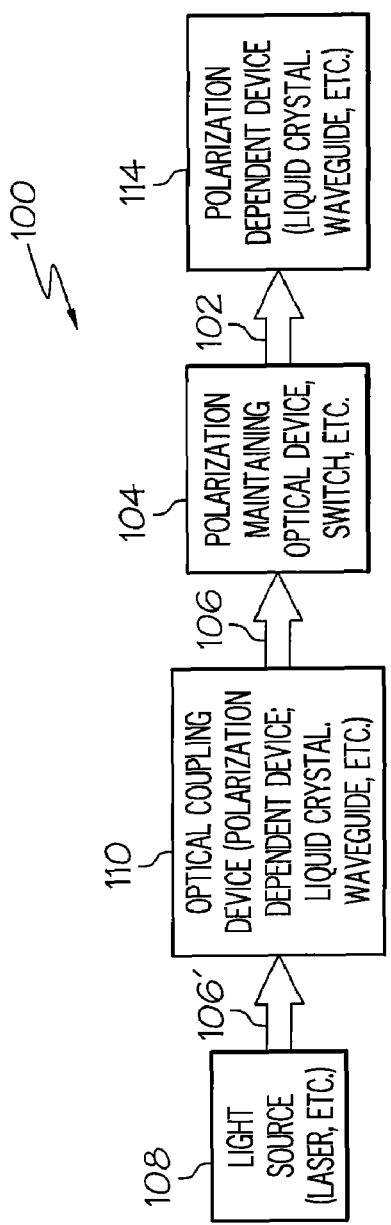
FIG. 1 is a block diagram of an example of an optical system in accordance with an embodiment of the present invention.

FIG. 1 is a block diagram of an example of an optical system 100 in accordance with an embodiment of the present invention. The optical system 100 may be an optical communications system or portion of a communications system, optical test equipment, optical instrumentation or other optical system that requires the polarization of the light beams to be maintained between the input and output of the system or portion of the system. Accordingly, an output light beam 102 from a PM optical device 104 is desired to have the same polarization as an input light beam 106' from a light source 108 or from any intermediate optical coupling device 110 receiving a light beam 106' from the light source 108. The light source 108 may be a laser beam source or other light source that may generate a light beam in the visible light spectrum, infrared or ultraviolet spectrums.

The intermediate optical coupling device 110 may be a polarization dependent device, such as a liquid crystal, optical waveguide or other polarization dependent device. The PM optical device 104 may be a PM optical collimator, collimator array, PM switch or the like. Examples of PM optical device 104 will be described in more detail herein. The PM optical device 104 may receive the input light beam 106 and optically couple the light beam 106 as output beam 102 with the proper orientation of polarization axis with respect to a polarization dependent device 114. The polarization dependent device 114 may be similar to the polarization dependent device 110.

Figure 3:
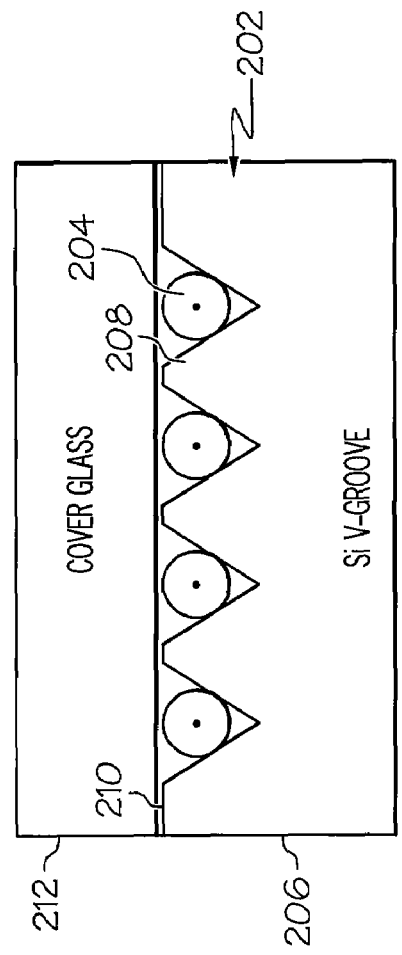
FIG. 3 is a cross-sectional view of the one-dimensional PM optical fiber array of FIG. 2.
Figure 2:
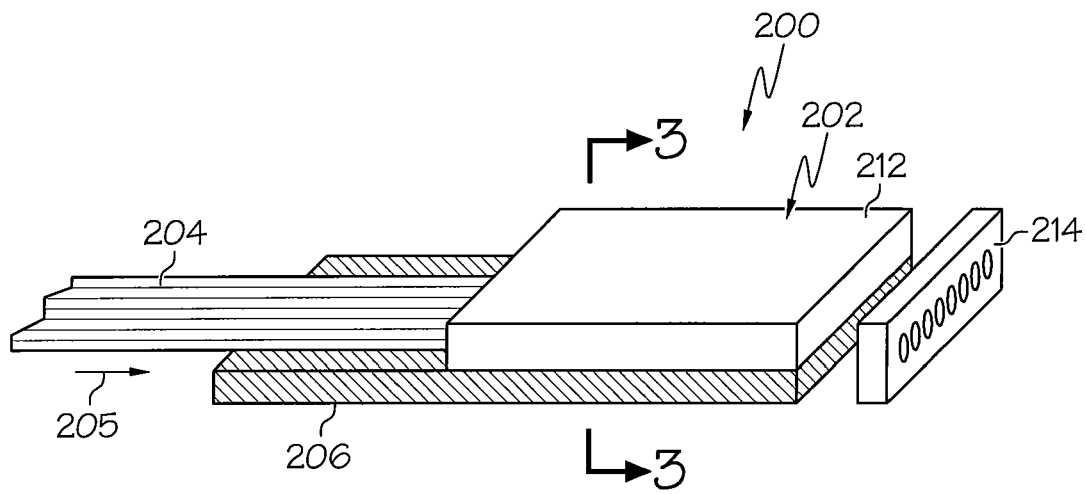
FIG. 2 is an illustration of an example of a one-dimensional polarization maintaining (PM) optical collimator array in accordance with an embodiment of the present invention.

FIG. 2 is an illustration of an example of a one-dimensional polarization maintaining (PM) optical collimator array 200 in accordance with an embodiment of the present invention. The PM optical collimator array 200 may be used for the PM optical device 104 in the system 100 of FIG. 1 or the collimator array 200 may be used in any optical system where maintaining polarization of the light beam is important. The polarization optical collimator array 200 may include a PM optical array 202. The PM optical array 202 may include at least one PM optical fiber 204 or other medium capable of transmitting light energy and maintaining the polarization status of the light, or an array of PM optical fibers 204 or other PM light transmitting media, as best shown in FIG. 3. FIG. 3 is a cross-sectional view of the one-dimensional PM optical fiber array 202 of FIG. 2. An axis of polarization of the PM fibers (or other PM medium), as illustrated by arrow 205, is aligned to a preferred orientation according to the particular application. The array 202 may include a substrate 206. A plurality of substantially equally spaced grooves 208 may be formed in a surface 210 of the substrate 206. The grooves 208 may be substantially V-shaped or U-shaped or any shape to permit the optical fibers 204 or filaments to be disposed in the respective grooves 208. The grooves 208 may be formed by photolithography, chemical etching or other techniques similar to those used in fabricating semiconductor devices. The grooves 208 may also be fabricated with machining, such as diamond turning or the like. The substrate 206 may be made from silicon, glass, ceramics or any material to permit the grooves 208 to be formed by photolithography, chemical etching, diamond turning or other techniques.

A layer of material 212 may be disposed on the surface 210 of the substrate 206 and covering the optical fibers 204. The layer of material may be a glass cover or other protective material to retain the optical fibers 204 in position and to protect the optical fibers from damage.

The PM optical collimator array 200 may also include a microlens array 214 optically coupled to the PM optical array 202. While the PM collimator array 200 and the microlens array 214 are illustrated in FIG. 2 as being substantially square or rectangular in shape, the PM optical collimator array 200 may also be formed in other configurations depending upon the application.

Figure 4:
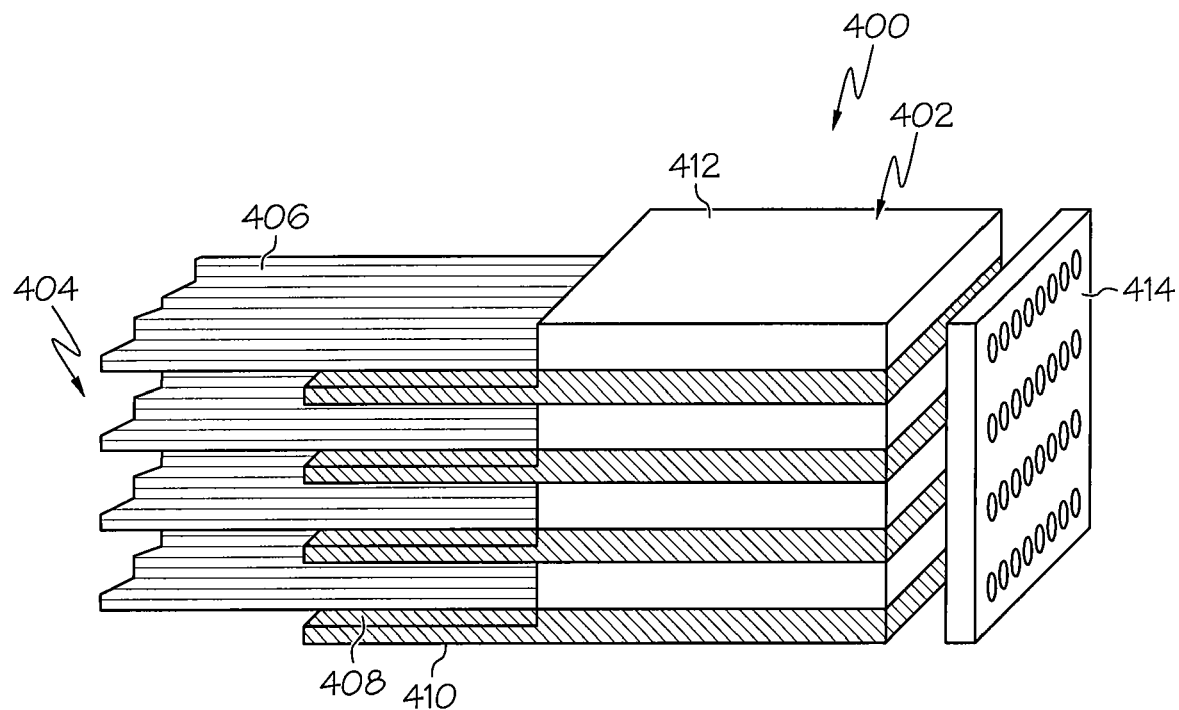
FIG. 4 is an illustration of a two-dimensional PM optical collimator array in accordance with an embodiment of the present invention.

FIG. 4 is an illustration of a two-dimensional PM optical collimator array 400 in accordance with an embodiment of the present invention. The two-dimensional PM optical collimator array 400 may also be used for the PM device 104 of FIG. 1, depending upon the application. The two-dimensional PM optical collimator array 400 may include a two-dimensional PM optical array 402. The two-dimensional optical array may include a plurality of one-dimensional PM optical arrays 404. Each of the one-dimensional PM optical arrays 404 may be similar to the one-dimensional PM optical array 202 illustrated in FIG. 1. Accordingly, each PM optical array 404 may have the same structure and may be formed similar to that described with respect to FIG. 3. Each PM optical array 404 may include one or a plurality of PM optical fibers 406 or other medium capable of transmitting light. The PM optical fibers 406 may be disposed in grooves (not shown in FIG. 4) similar to grooves 208 (FIG. 3) formed in a surface 408 of a substrate 410. The axis of polarization of the PM fibers may be aligned according to the preferred orientation based on the application. A cover layer 412 of material may be disposed on the surface 408 of each substrate 410 to retain the PM optical fibers 406 in place or in the grooves and to protect the fibers 406. The one-dimensional PM optical arrays 404 may be stacked on one another as illustrated in FIG. 4 to form the two-dimensional PM optical array 402.

The two-dimensional PM optical collimator array 400 may also include a two-dimensional microlens array 414 optically coupled to the two-dimensional PM optical array 402. The microlens 414 may optically couple the two-dimensional PM optical collimator array 400 to any polarization dependent device, such as device 114 illustrated in FIG. 1.

Figure 5:
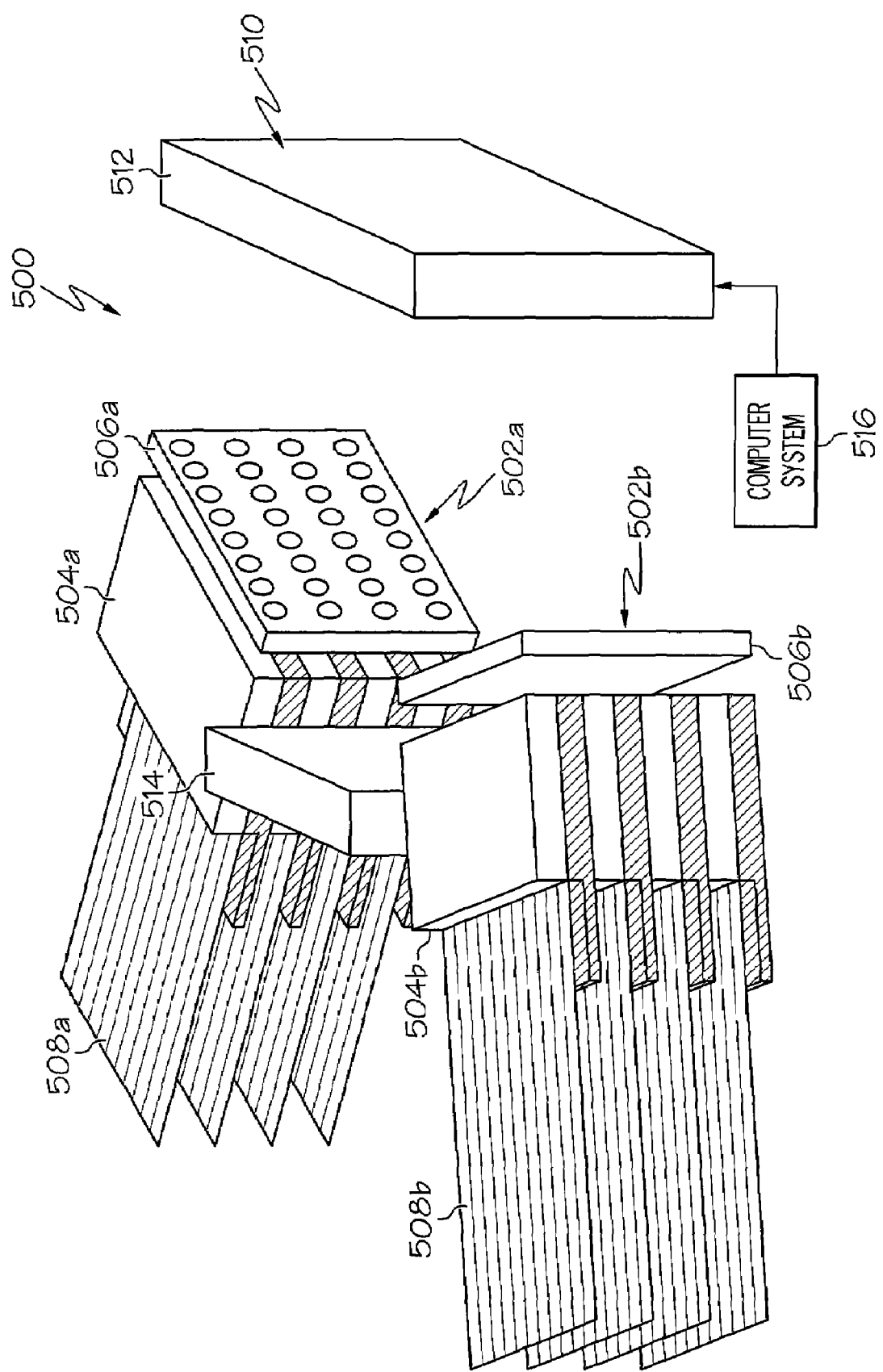
FIG. 5 is an illustration of a PM optical switch in accordance with an embodiment of the present invention.

FIG. 5 is an illustration of a PM optical switch 500 in accordance with an embodiment of the present invention. The PM optical switch 500 may be an optical cross-connect switch or similar device. Depending upon the application, the PM optical switch 500 may be used for the PM optical device 104 of FIG. 1.

The PM optical switch 500 may include a first two-dimensional PM optical collimator array 502a and a second two-dimensional PM optical collimator array 502b. Each of the two-dimensional PM collimator arrays 502a and 502b may be similar to the two-dimensional collimator array 400 described with reference to FIG. 4. Accordingly, each two-dimensional collimator array 502 may include a two-dimensional PM optical array 504 optically coupled to a two-dimensional microlens 506. The PM optical array 504 may include PM optical fibers 508 or other PM medium capable of transmitting light energy.

The PM optical switch 500 may also include a beam steering device 512. The beam steering device 512 may include a reflector or mirror, or series of reflectors or mirrors, or a liquid crystal beam deflector, or any other suitable beam steering device, to direct a light beam or light energy between the two two-dimensional PM collimator arrays 502. In the embodiment of the invention illustrated in FIG. 5, the beam steering device 510 may include a two-dimensional MicroElectroMechanical system (MEMS) mirror array 512 (or any other suitable arrayed beam steering device, such as a liquid beam deflector array) and a bulk mirror 514 or other devices capable of directing light in predetermined directions. The MEMS mirror 512 may receive light energy or a light beam from one of the two-dimensional collimator arrays 502 that may be defined as an input array. Elements or selected elements of the MEMS mirror array 512 may be controlled by a computer system 516 or similar device programmed to steer the angle of the MEMS mirror that directs the light beam on the bulk mirror 514. The bulk mirror 514 may then reflect the light beam back to the selected element on MEMS mirror array 512 where elements of the MEMS mirror array 512 may be controlled by the computer system 516 to steer the light beam to the selected channel on the other two-dimensional PM collimator array 502 that may be defined as the output array of the switch 500. The light beam or light energy collected by the other two-dimensional collimator array 502 may be outputted from the output PM optical array 504 and subsequently directed to a polarization dependent device, such as the device 114 of FIG. 1.

While the present invention has been described with respect to using two-dimensional optical array collimators, other applications or embodiments of the invention may use one-dimensional array collimators. Additionally, while the PM collimator arrays 502 and components of the beam steering device 510 are illustrated in FIG. 5 as being substantially square or rectangular in shape, these components may also be formed in other configurations or shapes depending upon the application.

The block diagrams in the Figures illustrate the architecture, functionality, and operation of possible implementations of systems and methods according to various embodiments of the present invention. In this regard, each block in the block diagrams may represent a module, component, element or segment. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems which perform the specified functions or acts, or combinations of special purpose hardware.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A polarization maintaining optical device, comprising:
a polarization maintaining optical array;
a microlens array to receive light from the polarization maintaining optical array or to couple the light into the polarization maintaining optical array;
another microlens array;
another polarization maintaining optical array optically coupled to the other microlens array; and
a beam steering device to optically couple the microlens array and the other microlens array, wherein the beam steering device comprises:
one of only a single microelectromechanical system (MEMS) mirror array and a single liquid crystal deflector array, optically coupled to the microlens array; and
a bulk mirror optically coupled to one of the single MEMS mirror array and the single liquid crystal deflector array and disposed between the polarization maintaining optical array and the other polarization maintaining optical array and opposite to one of the single MEMS mirror array and the single liquid crystal deflector array.

2. The polarization maintaining optical device of claim 1, wherein the polarization maintaining optical array comprises a two-dimensional array.

3. The polarization maintaining optical device of claim 1, wherein the polarization maintaining optical array comprises at least one polarization maintaining optical fiber, and wherein an axis of polarization of the polarization maintaining optical fiber is aligned to a predetermined orientation.

4. The polarization maintaining optical device of claim 1, wherein the polarization maintaining optical array comprises a polarization maintaining optical fiber array and wherein an axis of polarization of the polarization maintaining optical fiber array is aligned to a predetermined orientation.

5. A polarization maintaining optical switch, comprising:
a first polarization maintaining optical collimator array;
a second polarization maintaining optical collimator array; and
a beam steering device to direct light between the first and second polarization maintaining optical collimator arrays, wherein the beam steering device includes only a single arrayed beam steering device and a reflection device disposed between the first polarization maintaining optical collimator array and the second polarization maintaining optical collimator array.

6. The polarization maintaining optical switch of claim 5, wherein each of the first and second polarization maintaining optical collimator arrays comprise a polarization maintaining optical fiber array and wherein axes of polarization of the polarization maintaining optical fiber array is aligned to a predetermined orientation.

7. The polarization maintaining optical switch of claim 5, wherein each of the first and second polarization maintaining optical collimator arrays comprises:
at least one polarization maintaining optical fiber including an axis of polarization aligned to a predetermined orientation; and
a microlens disposed relative to the optical fiber to transmit or receive light from the optical fiber.

8. The polarization maintaining optical switch of claim 5, wherein each of the first and second polarization maintaining optical collimator arrays comprise:
a substrate;
at least one groove formed in a surface of the substrate;
a polarization maintaining optical medium disposed in the at least one groove including an axis of polarization aligned to a predetermined orientation; and
a layer of material disposed on the surface of the substrate and covering the at least one polarization maintaining optical medium.

9. The polarization maintaining optical switch of claim 8, wherein the layer of material comprises a cover glass.

10. The polarization maintaining optical switch of claim 8, wherein the substrate is formed from one of a group comprising silicon, glass, and ceramic.

11. A polarization maintaining optical switch, comprising:
an input polarization maintaining optical array to receive a light beam with a predetermined polarization;
an input microlens array optically coupled to receiving the light beam from the input optical array;
a beam steering device optically coupled to receive the light beam from the input microlens array;
an output microlens array optically coupled to receive the light beam from the beam steering device; and an output polarization maintaining optical array optically coupled to the output microlens array to emit the light beam with the predetermined polarization, wherein the beam steering device comprises only a single arrayed beam steering device and a reflection device disposed between the input polarization maintaining optical array and the output polarization optical array.

12. The polarization maintaining optical switch of claim 11, wherein the beam steering device comprises a movable mirror.

13. The polarization maintaining optical switch of claim 11, wherein the beam steering device comprises:
one of only a single two-dimensional MEMS mirror array, or only a single two-dimensional liquid crystal beam deflector array optically coupled to the input microlens array and the output microlens array; and
a bulk mirror optically coupled to one of the single two-dimensional MEMS mirror array, or the single two-dimensional liquid crystal beam deflector array, and disposed between the input polarization maintaining optical array and the output polarization maintaining optical array.

14. A system for optically switching light, comprising:
a light source;
a polarization maintaining optical switch optically coupled to the light source, the polarization maintaining optical switch including:
a first polarization maintaining optical collimator array;
a second polarization maintaining optical collimator array;
a beam steering device optically coupled to the first and second polarization maintaining optical collimator arrays, wherein the beam steering device comprises only a single arrayed beam steering device and a reflection device disposed between the first polarization maintaining optical collimator array and the second polarization maintaining optical collimator array; and
a polarization dependent optical device optically coupled to the polarization maintaining optical switch.

15. The system of claim 14, wherein each of the first and second polarization maintaining optical collimator arrays comprises a polarization maintaining optical fiber array.

16. The system of claim 14, wherein each of the first and second polarization maintaining optical collimator arrays comprises:
at least one polarization maintaining optical fiber; and
a microlens optically coupled to the optical fiber, wherein the axes of polarization of the polarization maintaining optical fiber array is aligned to a predetermined orientation.

17. The system of claim 14, wherein the beam steering device comprises:
one of only a single MEMS mirror array, and a single liquid crystal beam deflector array; and
a bulk mirror optically coupled to one of the single MEMS mirror array and the single liquid crystal beam deflector array and disposed between the first polarization maintaining optical collimator array and the second polarization maintaining optical collimator array.

18. A method for maintaining polarization of a light beam through an optical device, comprising:
directing the light beam into an input polarization maintaining optical collimator array; and
steering the light beam through the optical device to an output polarization maintaining optical collimator array using only a single arrayed beam steering device and a reflection device disposed between the input polarization maintaining optical collimator array and the output polarization maintaining optical collimator array.

19. The method of claim 18, wherein steering the light beam comprises directing the light beam by an arrayed beam steering device.

20. The method of claim 18, wherein steering the light beam comprises directing the light beam between an arrayed beam steering device and a bulk mirror.

21. A method of making a polarization maintaining optical switch, comprising:
forming a first polarization maintaining optical collimator array;
forming a second polarization maintaining optical collimator array; and
providing a beam steering device to direct light between the first and second polarization maintaining optical collimator arrays, wherein providing the beam steering device comprises:
disposing a bulk mirror between the first polarization maintaining optical collimator array and the second polarization maintaining optical collimator array; and
providing only a single MEMS mirror array or a liquid crystal beam deflector array to receive a light beam from the first polarization maintaining optical collimator array, to reflect the light beam from the first polarization maintaining optical collimator array to the bulk mirror, to receive the light beam reflected back from the bulk mirror, and to reflect the light beam from the bulk mirror to the second polarization maintaining optical collimator array.

22. The method of claim 21, wherein forming each of the first and second polarization maintaining optical collimator arrays comprises:
providing at least one polarization maintaining optical fiber; and
disposing a microlens relative to the optical fiber to transmit or receive light from the optical fiber.

23. The method of claim 21, wherein forming each of the first and second polarization maintaining optical collimator arrays comprises:
forming at least one groove formed in a surface of a substrate;
disposing a polarization maintaining optical fiber in the at least one groove;
aligning an axis of polarization of the polarization maintaining fiber to a preferred orientation; and
disposing a layer of material on the surface of the substrate and covering the polarization maintaining optical fiber.

24. A method of maintaining polarization of a light beam through an optical device, comprising:
transmitting the light beam from an input polarization maintaining optical collimator array to an input microlens array;
transmitting the light beam from the input microlens array to an arrayed beam steering device;
reflecting the light beam from the arrayed beam steering device to a bulk mirror disposed between the input polarization maintaining optical collimator array and an output polarization maintaining optical collimator array and opposite to the arrayed beam steering device;
reflecting the light beam from the bulk mirror back to the arrayed beam steering device;
reflecting the light beam from the arrayed beam steering device to an output microlens array; and
transmitting the light from the output microlens array to the output polarization maintaining optical collimator array.

* * * * *